United States Patent [19]

Okada et al.

[11] Patent Number: 4,785,439
[45] Date of Patent: Nov. 15, 1988

[54] OPTICAL MEMORY ACCESSING AND TRACKING APPARATUS WITH PICKUP AND LENS SERVOING DURING TRACKING

[75] Inventors: Hiroo Okada, Ina; Yoshiaki Ikeda; Ken Ohshima, both of Tokyo, all of Japan

[73] Assignee: Olympus Optical Co., Ltd., Tokyo, Japan

[21] Appl. No.: 834,937

[22] Filed: Feb. 28, 1986

[30] Foreign Application Priority Data

Mar. 8, 1985 [JP] Japan ................... 60-45784

[51] Int. Cl.⁴ ............ G11B 21/08; G11B 21/10; G11B 7/09
[52] U.S. Cl. ........................ 369/32; 369/44; 369/41
[58] Field of Search ............... 369/32, 33, 41, 44, 369/43, 46; 360/77, 78

[56] References Cited

U.S. PATENT DOCUMENTS

| | | | |
|---|---|---|---|
| 3,906,326 | 9/1972 | Chur | 369/41 |
| 3,924,268 | 12/1975 | McIntosh et al. | 360/78 |
| 4,138,663 | 2/1979 | Lehureau et al. | 369/44 |
| 4,268,745 | 5/1981 | Okano | 369/44 |
| 4,338,682 | 7/1982 | Hosaka et al. | 369/44 |
| 4,432,082 | 2/1984 | Hsieh et al. | 369/32 |
| 4,481,613 | 11/1984 | Yokota | 360/78 |
| 4,539,664 | 9/1985 | Deguchi et al. | 369/32 |
| 4,562,562 | 12/1985 | Moriya et al. | 369/44 |
| 4,573,087 | 2/1986 | Tezuka et al. | 360/75 |
| 4,615,023 | 9/1986 | Inada et al. | 369/32 |

FOREIGN PATENT DOCUMENTS

| | | |
|---|---|---|
| 090379 | 10/1983 | European Pat. Off. |
| 59-148182 | 8/1984 | Japan ................... 369/32 |

Primary Examiner—Raymond F. Cardillo
Assistant Examiner—Steven R. Garland
Attorney, Agent, or Firm—Frishauf, Holtz, Goodman & Woodward

[57] ABSTRACT

An optical recording/reproducing apparatus includes a pickup with a laser light source, an objective lens and lens drive coil for moving the optical axis of the laser beam transmitted through objective lens, a carriage drive voice-coil motor for moving a carriage with the pickup mounted thereon to move the laser beam transmitted through the objective lens, and tracking apparatus for operating both the lens drive coil and the carriage drive voice-coil motor. The tracking apparatus includes a lens servo stable detecting device for detecting that the laser beam from the objective lens has reached a desired track, apparatus for turning on a servo control loop with the lens drive coil in response to a tracking instruction, and apparatus for turning on a servo control loop with the carriage drive voice-coil motor in response to a detection output from the lens servo stable detecting device.

15 Claims, 5 Drawing Sheets

FIG. 2
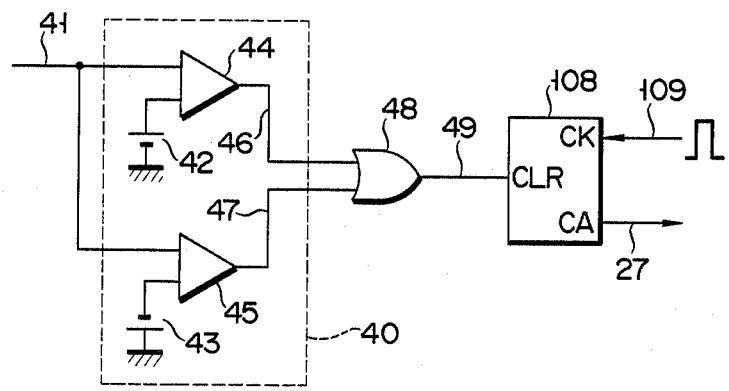
FIG. 3A (41)
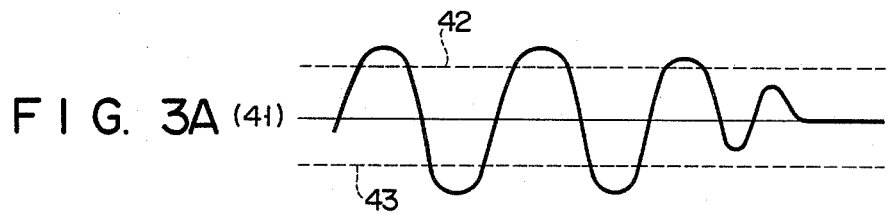
FIG. 3B (46)
FIG. 3C (47)
FIG. 3D (49)
FIG. 3E (27)
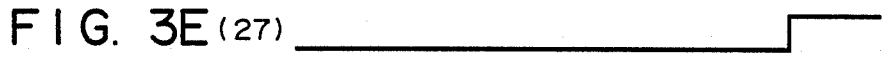

FIG. 4
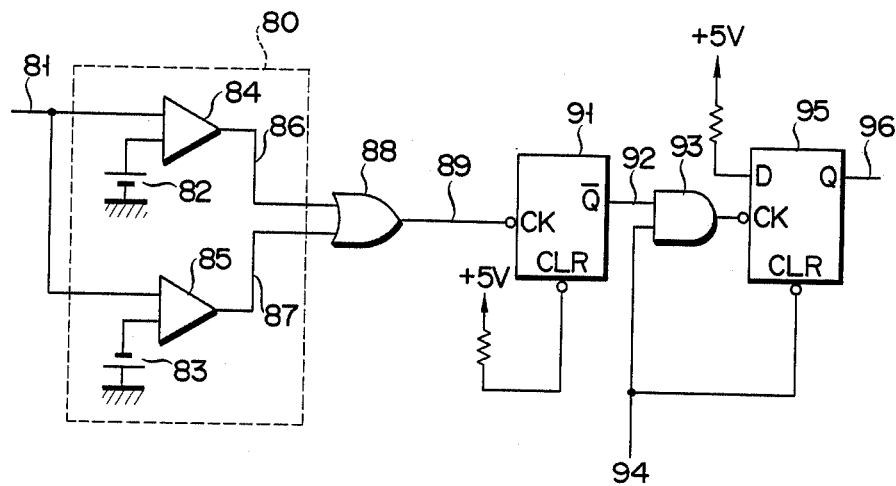
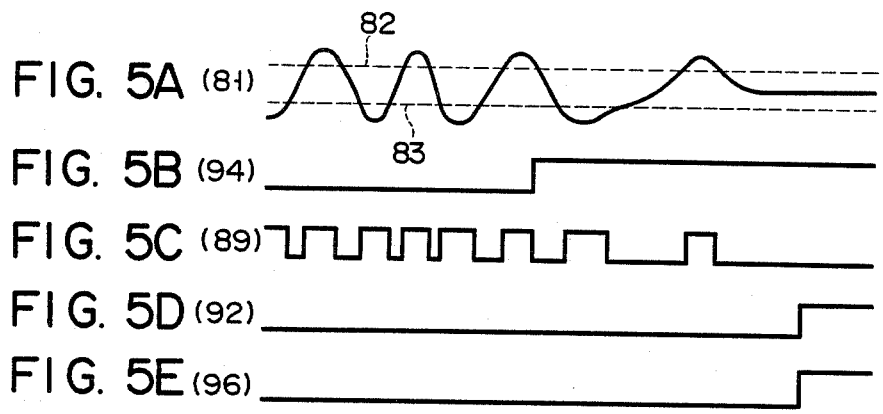
FIG. 5A (81)
FIG. 5B (94)
FIG. 5C (89)
FIG. 5D (92)
FIG. 5E (96)

OPTICAL MEMORY ACCESSING AND TRACKING APPARATUS WITH PICKUP AND LENS SERVOING DURING TRACKING

BACKGROUND OF THE INVENTION

The present invention relates to an optical recording/reproducing apparatus which uses an optical data recording medium such as an optical disk.

In general, in order to read out data from an optical disk, a laser beam is emitted onto a data recording track (hereinafter referred to as a track), and data is reproduced in accordance with the beam reflected by the disk or transmitted through the disk. When tracks are helically formed on the optical disk, servo control (tracking control) is necessary for an optical head to accurately emit the reproduction laser beam onto a given track, since sectors of the same track are not equidistantly arranged with respect to the center of rotation. Even if tracks are concentrically formed on the optical disk, sectors within the same track may not be equidistantly arranged with respect to the center of rotation due to eccentricity of the disk or the like, thus making tracking control necessary.

A conventional tracking circuit is available which changes the position of an objective lens in response to a tracking error signal obtained by light reflected by or transmitted through an optical disk. When a track error caused by eccentricity exceeds 30 to 40 μm, however, the objective lens itself deviates considerably from the mechanical center. In this case, an optical offset signal is superposed on the tracking error signal. Therefore, the laser beam scans an erroneous track in response to the optical offset signal.

In order to eliminate the optical offset signal, a conventional two-stage servo control system has been developed (e.g., Japanese Patent Disclosure No. 59-152572). According to this system, an optical head carriage is driven in addition to an objective lens, with tracking control being performed in combination by the objective lens and the optical head carriage. More specifically, the tracking error signal is supplied not only to an objective lens drive coil but also to a carriage drive voice-coil motor.

The conventional two-stage servo control system also has a drawback. Since the relationship between the drive timings of an object lens and a carriage is not fixed, it takes a long period of time to stabilize a laser beam on a track if the timings are not properly set.

SUMMARY OF THE INVENTION

It is an object of the present invention to provide an optical recording/reproducing apparatus wherein tracking errors of the conventional two-stage servo control system have been eliminated, and a laser beam can be positioned on a desired track and scanned the desired track with high precision at high speed.

The optical recording/reproducing apparatus according to the present invention has the following means:
 pickup means with a laser source, an objective lens and lens driving means for moving the axis of the laser beam transmitted through said objective lens;
 pickup driving means for moving said pickup means to move a laser beam transmitted through said objective lens;
 lens stable detecting means for detecting that the laser beam transmitted through said objective lens has reached a desired track; and
 tracking means for biasing said lens driving means in response to a tracking instruction, and for biasing said pickup driving means in response to a detection output from said lens stable detecting means.

BRIEF DESCRIPTION OF THE DRAWINGS

FIG. 2 is a circuit diagram showing a detailed arrangement of the lens control stable detector in the first embodiment;

FIGS. 3A to 3E are timing charts explaining the operation of the lens control stable detector in FIG. 2;

FIG. 4 is a circuit diagram showing a detailed arrangement of the carriage control stable detector in the first embodiment;

FIGS. 5A to 5E are timing charts explaining the operation of the carriage control stable detector shown in FIG. 4;

DETAILED DESCRIPTION OF THE PREFERRED EMBODIMENTS

Figure 1:
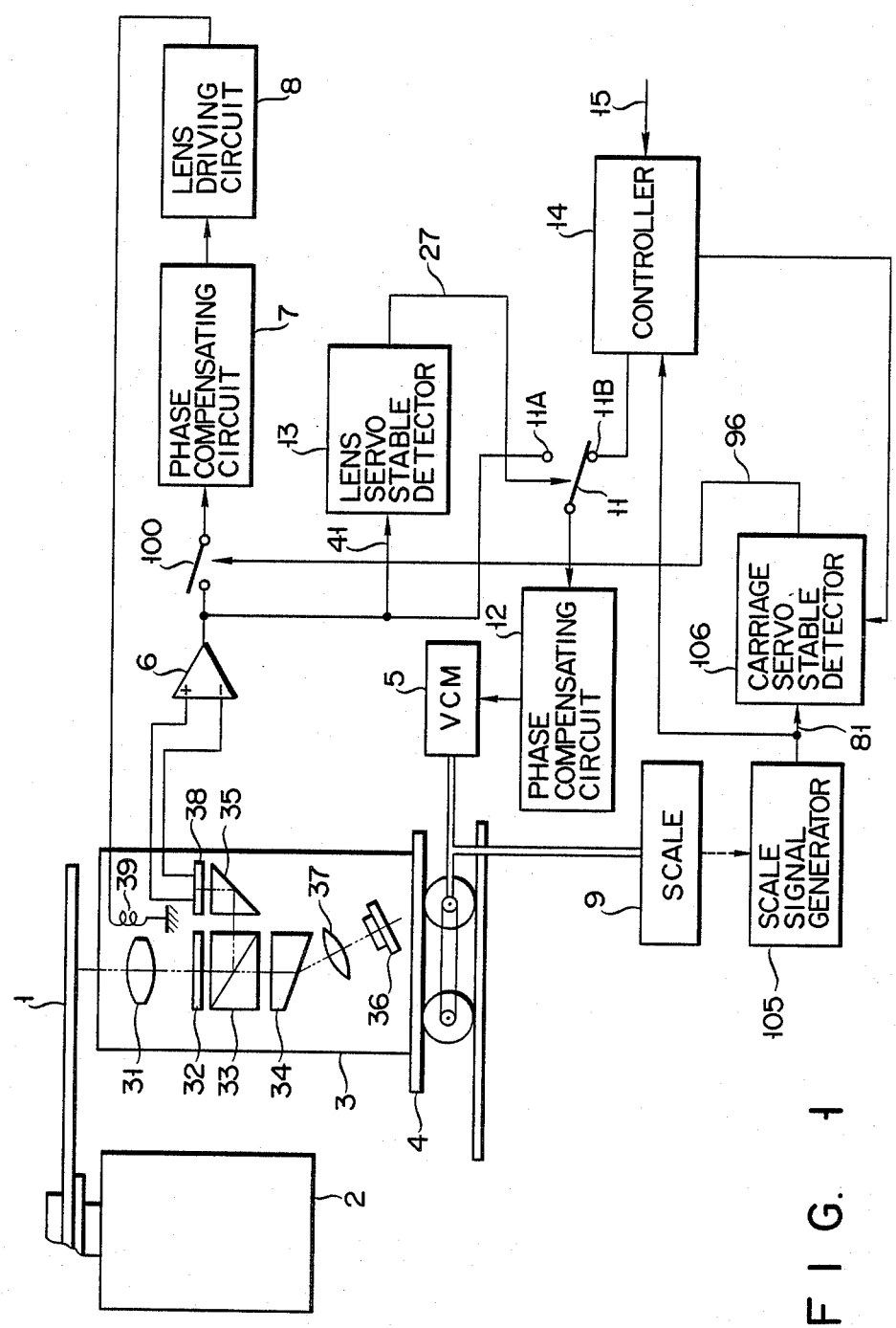
FIG. 1 is a block diagram of an optical recording/reproducing apparatus according to a first embodiment of the present invention.

Optical recording/reproducing apparatuses according to preferred embodiments of the present invention will be described with reference to the accompanying drawings. FIG. 1 is a block diagram of an optical recording/reproducing apparatus according to a first embodiment of the present invention. For the sake of simplicity, the first embodiment exemplifies an apparatus for reproduction only. Optical disk 1, as a data recording medium, is rotated by spindle motor 2 at a constant velocity. The surface of disk 1, containing recorded data, faces downward, and optical pickup 3 is arranged below disk 1. Pickup 3 focuses a laser beam from semiconductor laser 36 onto disk 1.

The laser beam from laser 36 is incident on shaping prism 34 through collimator lens 37, so that the cross sectional shape of the laser beam is circular. The laser beam from prism 34 is incident on ¼ wavelength plate 32 and objective lens 31 through polarizing prism 33. The laser beam from lens 31 is incident on a track. A beam reflected by the track is incident on prism 33 so that the optical path of the beam is bent through 90 degrees. The laser beam is then incident on a data reproduction section (not shown) through total reflection prism 35, and on photodetector 38 which has from two to four split detection regions.

A difference output from photodetector 38 is supplied to differential amplifier 6 which then generates a push-pull tracking error signal. Lens 31 is moved by coil 39—the objective lens driving means—in the radial direction of disk 1. In this manner, the laser beam is guided to a desired track. Pickup 3 itself is mounted on carriage 4. Carriage 4 is moved in the radial direction of disk 1 by voice-coil motor (VCM) 5—a carriage driving means—so that the laser beam can also be scanned via motor 5.

Tracking error signal 41 from amplifier 6 is supplied to lens servo stable detector 13, first input terminal 11A of selector 11, and phase compensating circuit 7, through switch 100. Output from circuit 7 is supplied to lens driving circuit 8. Circuit 8 drives lens 31 through coil 39.

Detector 13 detects, in response to the tracking error signal, whether or not lens tracking control is completed. Lens tracking control will be described in detail with reference to FIGS. 2 and 3A to 3E. Tracking error signal 41 (i.e., the solid line in FIG. 3A) is supplied to window comparator 40 wherein it is compared by comparators 44 and 45 with positive and negative reference voltages 42 and 43 (the broken lines in FIG. 3A). Outputs 46 and 47 (FIGS. 3B and 3C) from comparators 44 and 45 are supplied to OR gate 48. OR gate 48 generates pulse signal 49 shown in FIG. 3D, when signal 41 falls outside the threshold range of comparator 40. When signal 41 falls within the threshold range of comparator 40, OR gate 48 stops generating signal 49. In other words, pulse signal 49 is generated from OR gate 48 until the laser beam reaches the desired track.

Signal 49 from OR gate 48 is supplied to clear terminal CLR of counter 108. Counter 108 is continuously cleared by pulse signal 49 until the laser beam reaches the desired track. When the laser beam reaches the desired track, counter 108 is not cleared and counts the number of clock pulses, 109, supplied to clock terminal CK. When the count reaches a maximum value, counter 108 generates carry signal CA as lens servo stable signal 27. In other words, detector 13 generates signal 27 when a predetermined period of time has elapsed after the laser beam reaches the desired track. Signal 27 is supplied to a control terminal of selector 11.

A carriage control signal from controller 14 is supplied to second input terminal 11b of selector 11. The carriage control signal includes a velocity control signal and a position control signal which will be described later. Selector 11 is normally connected with terminal 11B; however, upon generation of signal 27, selector 11 is switched to terminal 11A. An output from selector 11 is supplied to motor 5 through phase compensating circuit 12.

Scale 9 is mounted on carriage 4. Scale values are read to detect displacement of carriage 4. Scale 9 may comprise an optical scale, a magnetic scale, or a potentiometer. An output scale signal from scale signal generator 105, for reading the value of scale 9, is supplied to controller 14 and carriage servo stable detector 106. Devices disclosed in U.S. Pat. No. 4,481,613 may be utilized as scale 9 and scale signal generator 105. More specifically, scale 9 has a grating pattern with a predetermined cycle. When carriage 4 is moved at a constant velocity, a sinusoidal scale signal of a constant period is generated. However, if the velocity of carriage 4 is changed, the period of the scale signal is also changed. When carriage 4 is stopped, the scale signal is disabled.

Detector 106 detects, in the same manner as detector 13, in response to the scale signal, whether or not carriage tracking control is completed. Carriage tracking control will be described in detail with reference to FIGS. 4 and 5A to 5E. Scale signal 81 (the solid line in FIG. 5A) is supplied to window comparator 80 wherein it is compared by comparators 84 and 85 with positive and negative reference voltages 82 and 83 (the broken lines in FIG. 5A). Outputs 86 and 87 from comparators 84 and 85 are supplied to clock terminal CK of retriggerable multivibrator 91 through OR gate 88.

When signal 81 falls outside the threshold range of comparator 80, gate 88 generates pulse signal 89, shown in FIG. 5C. However, when signal 81 falls within the threshold range of comparator 80 and the carriage is coming to a stop, gate 88 stops generating signal 89. Terminal CLR of multivibrator 91 is connected to a +5−V power source. Output ($\overline{Q}$) signal 92 (FIG. 5D) from multivibrator 91 is supplied to the first input terminal of AND gate 93. Position control mode signal 94 (FIG. 5B) from controller 14 is supplied to the second input terminal of gate 93. Signal 94 is generated when the velocity control mode comes to an end during track access. An output signal from gate 93 is supplied to clock terminal CK of D flip-flop 95. The input (D) terminal of flip-flop 95 is connected to the +5−V power source. Signal 94 is also supplied to terminal CLR of flip-flop 95. For this reason, multivibrator 91 is continuously triggered, and output ($\overline{Q}$) signal 92 is repressed until the carriage approaches the desired track. When the carriage approaches the desired track, multivibrator 91 is no longer triggered, and output ($\overline{Q}$) signal 92 goes high. In this case, upon reception of position control mode signal 94, output (Q) signal is generated by flip-flop 95. Output (Q) signal 96 (FIG. 5E) is generated from flip-flop 95 as a carriage servo stable signal, and is supplied to the control terminal of switch 100. Switch 100 is normally open. Upon generation of signal 96, switch 100 is closed.

Figure 6:
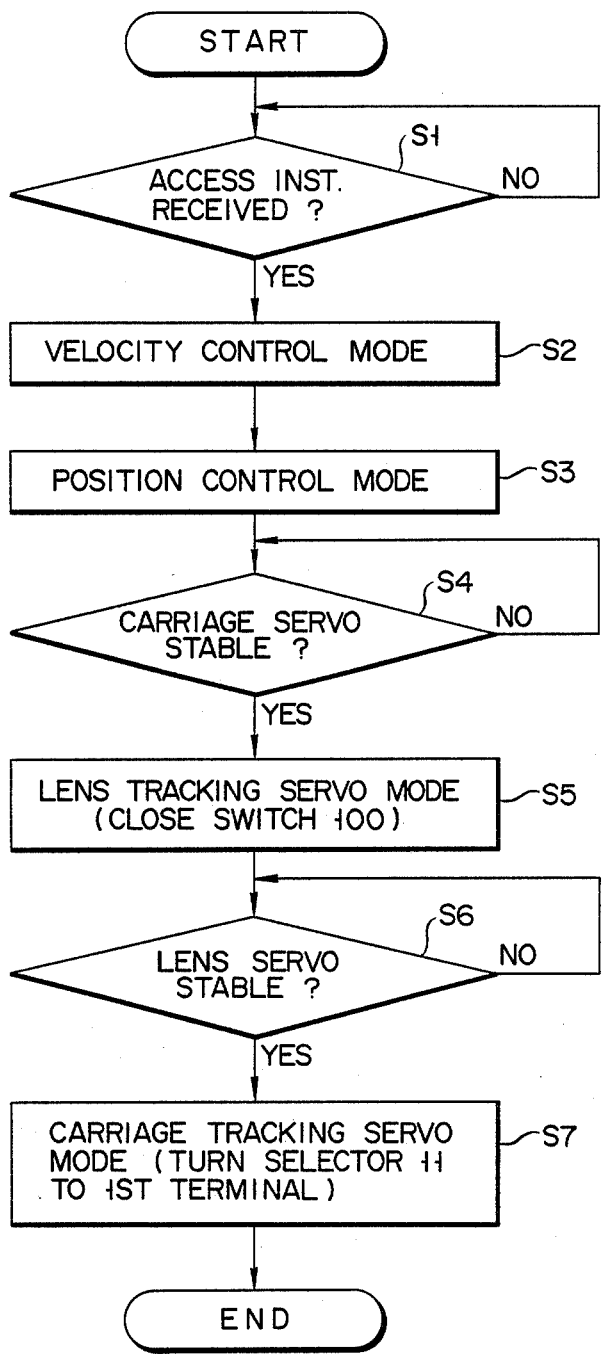
FIG. 6 is a flow chart explaining the overall operation of the first embodiment.

The operation of the first embodiment will be described with reference to the flow chart in FIG. 6. In its initial state, selector 11 is connected with terminal 11B, and switch 100 is open. When an instruction signal (one of instruction signals 15 in FIG. 1) for accessing (moving the carriage to the target track) is supplied from the host controller to controller 14 (step S1), controller 14 selects, from prestored carriage velocity control curves, a velocity control curve signal for controlling carriage velocity in response to the difference between the current carriage position (track address) and the target track address, and supplies the appropriate velocity control curve signal to motor 5 through terminal 11B of selector 11 and circuit 12 to thereby control the velocity of carriage 4. This operation mode is called the velocity control mode (step S2).

When carriage 4 approaches the target track, the modes change from the velocity control mode to the position control mode. Controller 14 stops generating the velocity control curve signal and starts generating a position control signal for preventing the deviation of carriage 4 from the stop position due to external vibrations or the like. Since selector 11 is kept at terminal 11B, the position control signal is supplied to coil 5 through selector 11 and circuit 12 (step S3). At this time, controller 14 supplies position control mode signal 94 to detector 106.

When such accessing is completed, tracking is started. In this embodiment, lens tracking control by circuit 8 is started. When detector 13 detects that the tracking error signal falls within the predetermined threshold range, carriage tracking control by motor 5 is started in addition to lens tracking control, thereby performing two-stage servo control, an operation requiring a more detailed description.

When access is almost completed, the velocity of carriage 4 is decreased, and signal 81 is converged within the threshold range, as shown in FIG. 5A. When signal 81 is sufficiently converged and the carriage is determined as having stopped (step S4), signal 96 is, as shown in FIG. 5E, generated, and switch 100 is closed. Upon the closing of switch 100, a lens tracking servo loop consisting of photodetector 38, amplifier 6, switch 100, circuits 7 and 8 and coil 39 is formed, and lens tracking control is performed (step S5).

In this state, signal 41 starts converging, as shown in FIG. 3A. When signal 41 converges sufficiently and the laser beam is determined as having reached the desired track (step S6), signal 27 is output, as shown in FIG. 3E. Selector 11 is then connected with terminal 11A, and a carriage tracking servo loop consisting of photodetector 38, amplifier 6, selector 11, circuit 12 and motor 5 is formed in addition to the lens tracking servo loop, thus facilitating performance of both servo control operations (step S7). As a result, the laser beam is scanned to the desired track.

In the two-stage servo control system according to the first embodiment, lens servo tracking control is started prior to carriage servo tracking control. Thereafter, the two operations are performed together, thus providing the following advantage. In general, gain $G_V$ of the carriage servo tracking loop for the tracking error signal is larger than gain $G_L$ of the lens servo tracking loop for the tracking error signal. For this reason, when carriage servo tracking control is performed for a tracking error signal of a large magnitude, the voice-coil motor overruns to cause improper tracking of the laser beam. However, when lens servo tracking control is performed first to decrease the tracking error signal, and then carriage servo tracking control is started, two-stage servo control can be stabilized.

Figure 7:
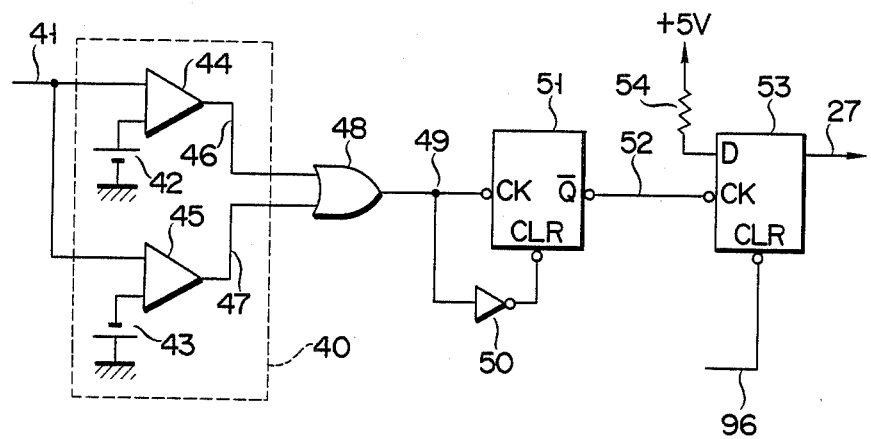
FIG. 7 is a circuit diagram of the main part of an optical recording/reproducing apparatus according to a second embodiment of the present invention: a lens control stable detector.

Other embodiments of the present invention will be described hereinafter. FIG. 7 is a circuit diagram of lens servo stable detector 13, as the main part of the second embodiment. Tracking error signal 41 is supplied to window comparator 40 wherein it is compared by comparators 44 and 45 with positive and negative reference voltages 42 and 43. Outputs from comparators 44 and 45 are output through OR gate 48. The above operations are the same as those in the first embodiment (FIG. 2). An output from gate 48 is supplied to clock terminal CK of retriggerable multivibrator 51. Terminal CK of multivibrator 51 is connected to clear terminal CLR thereof through inverter 50. An output ($\overline{Q}$) signal from multivibrator 51 is supplied to clock terminal CK of D flip-flop 53. Carriage servo stable signal 96 from detector 106 is supplied to terminal CLR of flip-flop 53. The input (D) terminal of flip-flop 53 is connected to a $+5-V$ power source. An output (Q) signal from flip-flop 53 is supplied as lens servo stable signal 27 to the control terminal of selector 11.

Unless signal 96 is supplied to terminal CLR of flip-flop 53, i.e., unless carriage access is completed and tracking is started, when detector 13 is arranged as just described, signal 27 is not generated even if multivibrator 51 generates a pulse due to external noise, thereby further improving the reliability of the apparatus.

Figure 8:
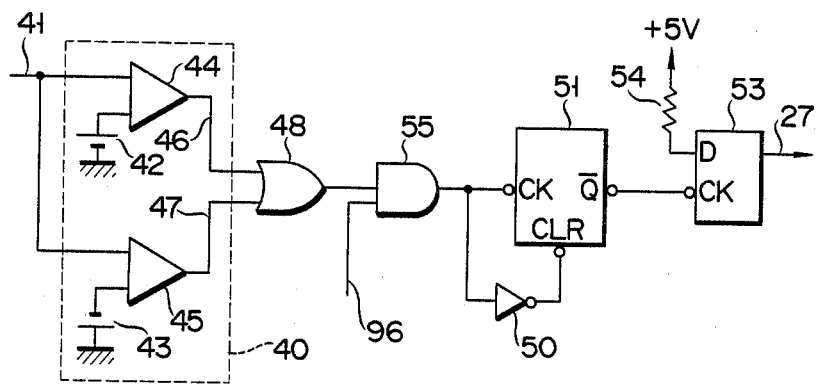
FIG. 8 is a circuit diagram of the main part of an optical recording/reproducing apparatus according to a third embodiment of the present invention: a lens control stable detector.

FIG. 8 is a circuit diagram of lens servo stable detector 13, as the main part of a third embodiment of the present invention. This embodiment differs from the second embodiment in that it has a circuit for calculating the logical OR of lens servo stable signal 27 and carriage servo stable signal 96. An output from OR gate 48 is supplied to the first input terminal of AND gate 55. Carriage servo stable signal 96 is supplied to the second input terminal of gate 55. An output from gate 55 is supplied to clock terminal CK of multivibrator 51.

As previously, unless signal 96 is supplied, i.e., unless carriage access is completed and tracking is started, when detector 13 is arranged as described in preceding, signal 27 is not generated, thereby improving the reliability of the apparatus.

The present invention is not limited to the particular embodiments described above. For example, switch 100, for controlling formation of the lens servo tracking loop of FIG. 1, can be connected to the output of circuit 7. Similarly, selector 11, for controlling the formation of the carriage servo tracking loop, can be connected to the output of circuit 12. In the same vein, while the above embodiments are exemplified by reproduction apparatuses, the present invention can also be applied to recording and reproducing apparatuses. Furthermore, the recording medium is not limited to disks, but can consist of tapes, cards, drums or the like.

What is claimed is:

1. An optical recording/reproducing apparatus having a velocity control mode used for approaching a target from more than a preset distance, and a position control mode used when the target track is relatively close to being reached, said apparatus comprising:
   pickup means with a laser source for recording/reproducing data on a storage medium, an objective lens having an optical axis, and lens driving means for adjusting the optical axis of said objective lens relative to an information storage medium;
   pickup moving means for moving said pickup means relative to said information storage medium;
   lens stable detecting means for detecting that said objective lens is in a stable state in which a given position relative to said information storage medium is maintained; and
   tracking means for, in said position control mode, starting a lens servo-tracking operation of said lens driving means in response to a tracking instruction, and for starting a carriage servo-tracking operation of said pickup moving means in response to a detection output from said lens stable detecting means, the detection output representing that the lens is in the stable state.

2. An apparatus according to claim 1, in which said lens stable detecting means comprises:
   a photodetector for receiving a laser beam reflected by said information storage medium, and means coupled to the photodetector for generating a tracking error signal; and
   a window comparator means for detecting that the tracking error signal falls within a predetermined threshold range.

3. An apparatus according to claim 2, in which said tracking means comprises:
   a first control loop, including said lens driving means turned on in response to the tracking instruction; and
   a second control loop, including said pickup moving means, turned on in response to the detection output from said lens stable detecting means.

4. An apparatus according to claim 3, in which said first control loop comprises said photodetector, coil means for moving the optical axis of said objective lens, the coil means turning on in response to the tracking error signal, and first switch means connected between said photodetector and said coil means for closing the first control loop when said pickup means is within a preselected distance of said given position, and said second control loop comprises said photodetector, a motor means for moving said pickup driving means with said pickup means mounted thereon, the motor means turning on in response to the tracking error signal, and second switch means conncted between said photodetector and said motor means for closing the second control loop in response to said detection output from the lens stable detecting means.

5. An apparatus according to claim 2, in which said tracking means comprises a timer for counting a predetermined time period after the tracking error signal falls within the predetermined threshold range, and said tracking means biases said pickup moving means in response to said timer.

6. A tracking system for setting an optical recording-/reproducing apparatus at a command position radially along a disc-type information storage medium, comprising:

pickup means including a laser source for recording-/reproducing data on a storage medium, an objective lens having an optical axis and being operably associated with said laser source, and a lens driving means for adjusting the optical axis direction of said objective lens to vary a coincidence position at which said optical axis meets said storage information medium;

pickup moving means for translating the pickup means radially relative to said information storage medium;

detecting means coupled to said pickup moving means for measuring the position along said information storage medium of said pickup driving means and for generating a position signal when the pickup moving means is within a preset first range of said command position;

sensing means coupled to said lens driving means for measuring the coincidence position along said information storage medium at which the optical axis of the objective lens meets said information storage medium and for generating a coincidence signal when the coincidence position is within a given second range of said command position;

first control means responsive to said position signal of the detecting means for, when the pickup moving means is within said preset first range of said command position, closing a first circuit loop including the sensing means and the lens driving means, and second control means responsive to the sensing means for, while the coincidence position is outside said given second range of said command position, keeping open a second circuit loop including the sensing means and the moving means, said second range being smaller than said first range; and third control means responsive to said coincidence signal for closing the second circuit loop only after the first circuit loop is closed and for maintaining the first circuit loop closed.

7. An apparatus according to claim 6, wherein said sensing means comprises a photodetector responsive to a laser beam reflected by said information storage medium, first means responsive to said photodetector generating a tracking error signal, and second means responsive to said first means for determining that said tracking error signal falls within said second range.

8. An apparatus according to claim 7, wherein said first control means includes timing means for inhibiting the generation of said coincidence signal if said coincidence position is not within said given second range for at least a preset minimum time period.

9. An apparatus according to claim 8, further comprising third means coupled to said detecting means for determining whether the pickup moving means is within said first range and, if so, for outputting an enabling signal to the first control means.

10. An apparatus according to claim 9, wherein said third means includes timing means for inhibiting the generation of said coincidence signal if said pickup moving means is not within said first range for at least a preset time period.

11. An apparatus according to claim 6, wherein said first control means includes timing means for inhibiting the generation of said coincidence signal if said coincidence position is not within said given second range for at least a preset minimum time period.

12. An apparatus according to claim 11, further comprising third means coupled to said detecting means for determining whether the pickup moving means is within said first range and, if so, for outputting an enabling signal to the first control means.

13. An apparatus according to claim 12, wherein said third means includes timing means for inhibiting the generation of said coincidence signal if said pickup moving means is not within said first range for at least a preset time period.

14. An apparatus according to claim 6, further comprising third means coupled to said detecting means for determining whether the pickup moving means is within said first range and, if so, for outputting an enabling signal to the first control means.

15. An apparatus according to claim 14, wherein said third means includes timing means for inhibiting the generation of said coincidence signal if said pickup moving means is not within said first range for at least a preset time period.

* * * * *